United States Patent
Chao et al.

(10) Patent No.: US 11,840,174 B2
(45) Date of Patent: Dec. 12, 2023

(54) VEHICULAR OVERHEAD CONSOLE WITH LIGHT TRANSMISSIVE PANEL

(71) Applicant: Magna Mirrors of America, Inc., Holland, MI (US)

(72) Inventors: Li Chao, Shanghai (CN); Caitlyn Cote, Aschaffenburg (DE)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/180,394

(22) Filed: Mar. 8, 2023

(65) Prior Publication Data

US 2023/0286435 A1    Sep. 14, 2023

Related U.S. Application Data

(60) Provisional application No. 63/269,178, filed on Mar. 11, 2022.

(51) Int. Cl.
| | |
|---|---|
| *B60Q 3/74* | (2017.01) |
| *B60R 7/04* | (2006.01) |
| *B60Q 3/82* | (2017.01) |
| *F21V 14/00* | (2018.01) |
| *B60Q 3/51* | (2017.01) |
| *B60R 11/00* | (2006.01) |

(52) U.S. Cl.
CPC .............. *B60Q 3/74* (2017.02); *B60Q 3/51* (2017.02); *B60Q 3/82* (2017.02); *B60R 7/04* (2013.01); *F21V 14/003* (2013.01); *B60R 2011/0028* (2013.01)

(58) Field of Classification Search
CPC .... B60Q 3/51; B60Q 3/74; B60Q 3/82; F21V 14/003
See application file for complete search history.

(56) References Cited

U.S. PATENT DOCUMENTS

| | | |
|---|---|---|
| 4,793,690 A | 12/1988 | Gahan et al. |
| 5,193,029 A | 3/1993 | Schofield et al. |
| 5,285,060 A | 2/1994 | Larson et al. |
| 5,416,313 A | 5/1995 | Larson et al. |

(Continued)

FOREIGN PATENT DOCUMENTS

| | | |
|---|---|---|
| WO | 2023034956 A1 | 3/2023 |
| WO | 2023062132 A1 | 4/2023 |

*Primary Examiner* — Thomas M Sember
(74) *Attorney, Agent, or Firm* — HONIGMAN LLP

(57) ABSTRACT

A vehicular overhead console module includes a base portion configured to attach at an interior cabin portion of a vehicle. A light source is accommodated by the base portion and is electrically operable to emit light. A light transmitting panel is disposed at the base portion and includes an electrically dimmable medium. The electrically dimmable medium is adjustable at least between a first light transmission state, where the light transmitting panel has a first level of light transmissivity, and a second light transmission state, where the light transmitting panel has a second level of light transmissivity. The first level of light transmissivity is greater than the second level of light transmissivity. When the electrically dimmable medium is at the first light transmission state, light emitted by the light source passes through the light transmitting panel to illuminate at least a portion of an interior cabin of the vehicle.

26 Claims, 4 Drawing Sheets

(56) References Cited

U.S. PATENT DOCUMENTS

| | | |
|---|---|---|
| 5,530,240 A | 6/1996 | Larson et al. |
| 5,594,222 A | 1/1997 | Caldwell |
| 5,668,663 A | 9/1997 | Varaprasad et al. |
| 5,724,187 A | 3/1998 | Varaprasad et al. |
| 6,001,486 A | 12/1999 | Varaprasad et al. |
| 6,310,611 B1 | 10/2001 | Caldwell |
| 6,320,282 B1 | 11/2001 | Caldwell |
| 6,329,925 B1 | 12/2001 | Skiver et al. |
| 6,369,804 B1 | 4/2002 | Sandbach |
| 6,420,975 B1 | 7/2002 | DeLine et al. |
| 6,428,172 B1 | 8/2002 | Hutzel et al. |
| 6,437,258 B1 | 8/2002 | Sandbach |
| 6,452,479 B1 | 9/2002 | Sandbach |
| 6,492,980 B2 | 12/2002 | Sandbach |
| 6,501,465 B2 | 12/2002 | Sandbach |
| 6,504,531 B1 | 1/2003 | Sandbach |
| 6,627,918 B2 | 9/2003 | Getz et al. |
| 6,690,268 B2 | 2/2004 | Schofield et al. |
| 6,902,284 B2 | 6/2005 | Hutzel et al. |
| 7,046,448 B2 | 5/2006 | Burgner |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,338,177 B2 | 3/2008 | Lynam |
| 7,360,932 B2 | 4/2008 | Uken et al. |
| 7,370,983 B2 | 5/2008 | DeWind et al. |
| 7,446,924 B2 | 11/2008 | Schofield et al. |
| 7,626,749 B2 | 12/2009 | Baur et al. |
| 7,734,392 B2 | 6/2010 | Schofield et al. |
| 7,855,755 B2 | 12/2010 | Weller et al. |
| 7,914,187 B2 | 3/2011 | Higgins-Luthman et al. |
| 8,890,955 B2 | 11/2014 | Peterson |
| 9,346,403 B2 | 5/2016 | Uken et al. |
| 9,405,120 B2 | 8/2016 | Graf et al. |
| 9,598,016 B2 | 3/2017 | Blank et al. |
| 10,017,114 B2 | 7/2018 | Bongwald |
| 10,065,574 B2 | 9/2018 | Tiryaki |
| 10,272,833 B2 | 4/2019 | Snider |
| 10,427,503 B2 | 10/2019 | Snider |
| 10,559,153 B2 | 2/2020 | Snider et al. |
| 11,518,401 B2 | 12/2022 | Kulkarni |
| 11,639,134 B1 | 5/2023 | Huizen et al. |
| 2006/0050018 A1 | 3/2006 | Hutzel et al. |
| 2009/0015736 A1 | 1/2009 | Weller et al. |
| 2010/0097469 A1 | 4/2010 | Blank et al. |
| 2013/0208501 A1* | 8/2013 | Ku ............ F21V 5/00 362/276 |
| 2014/0022390 A1 | 1/2014 | Blank et al. |
| 2014/0293169 A1 | 10/2014 | Uken et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0178157 A1* | 6/2016 | Li ............ G02F 1/1334 362/363 |
| 2016/0209647 A1 | 7/2016 | Fursich |
| 2017/0217367 A1 | 8/2017 | Pflug et al. |
| 2017/0274906 A1 | 9/2017 | Hassan et al. |
| 2018/0124899 A1* | 5/2018 | Robinson ........ H05B 47/11 |
| 2018/0222414 A1 | 8/2018 | Ihlenburg et al. |
| 2018/0231976 A1 | 8/2018 | Singh |
| 2019/0210615 A1 | 7/2019 | Caron et al. |
| 2020/0143560 A1 | 5/2020 | Lu et al. |
| 2020/0202151 A1 | 6/2020 | Wacquant |
| 2020/0320320 A1 | 10/2020 | Lynam |
| 2021/0151647 A1* | 5/2021 | Pfeffer ........... F21S 41/125 |
| 2021/0188092 A1 | 6/2021 | Peterson |
| 2021/0291739 A1 | 9/2021 | Kasarla et al. |
| 2021/0323473 A1 | 10/2021 | Peterson et al. |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0078512 A1 | 3/2023 | Peterson et al. |
| 2023/0131471 A1 | 4/2023 | Sobecki et al. |

* cited by examiner

VEHICULAR OVERHEAD CONSOLE WITH LIGHT TRANSMISSIVE PANEL

CROSS REFERENCE TO RELATED APPLICATION

The present application claims the filing benefits of U.S. provisional application Ser. No. 63/269,178, filed Mar. 11, 2022, which is hereby incorporated herein by reference in its entirety.

FIELD OF THE INVENTION

The present invention relates generally to the field of overhead consoles and associated accessories for vehicles.

BACKGROUND OF THE INVENTION

It is known to provide an overhead console at a roof/headliner of a vehicle. Overhead consoles are typically mounted to the vehicle headliner and are typically solid opaque parts including lighting features and control switches. Typical overhead console designs have transparent covers that provide a clear view of the lighting features, including optics and reflectors, of the overhead console.

SUMMARY OF THE INVENTION

A vehicular overhead console includes a frame portion configured to mount at an interior portion of a vehicle. At least one electronic accessory is disposed in the frame portion, and a light transmitting panel is disposed at the frame portion. The light transmitting panel includes electrically dimmable shutter film that is operably between a high visible light transmission state and a low visible light transmission state. The at least one electronic accessory is concealed by the electrically dimmable shutter film in the low visible light transmission state.

These and other objects, advantages, purposes and features of the present invention will become apparent upon review of the following specification in conjunction with the drawings.

DESCRIPTION OF THE PREFERRED EMBODIMENTS

Figure 1:
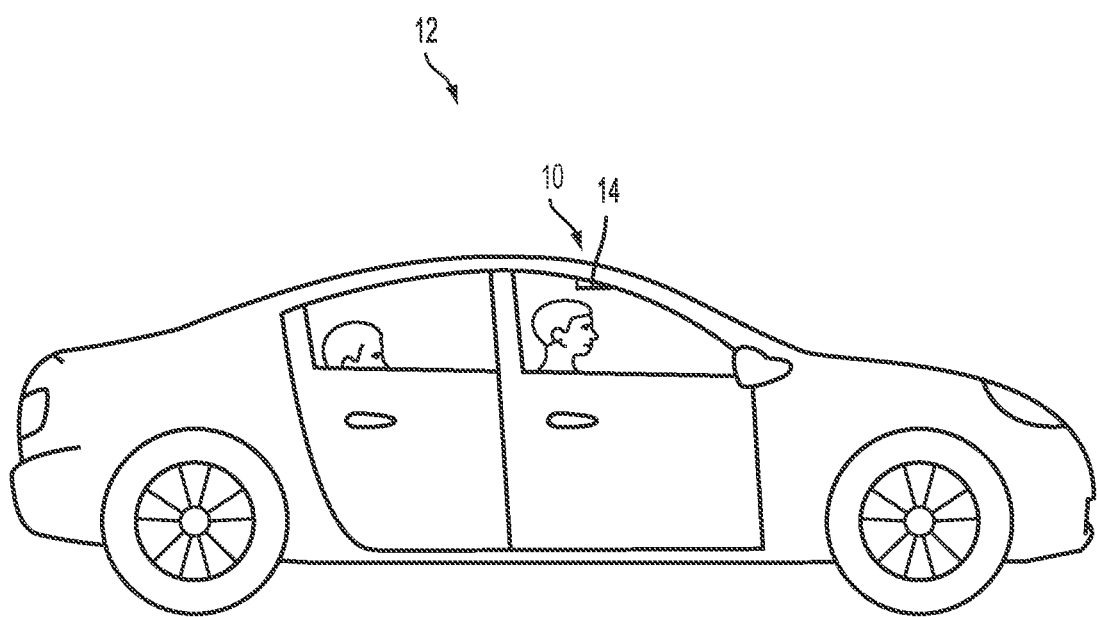
FIG. 1 is a side view of a vehicle with a vehicular overhead console installed at an interior portion of the vehicle.

Referring now to the drawings and the illustrative embodiments depicted therein, a vehicular accessory system 10 is disposed at an interior portion or cabin of a vehicle 12 (FIG. 1). The system 10 includes an overhead console 14. The overhead console 14 may include a portion that is at least partially transparent or translucent to allow light emitted by light sources of the overhead console to pass through the at least partially transparent or translucent portion, as described below. The overhead console 14 is mounted at or attached to a surface at the interior portion of the vehicle (such as an upper edge region of the windshield or the headliner of the vehicle) and extends rearward and along the surface (such as exemplified in FIG. 1). For example, the overhead console 14 may attach to the inner surface of the windshield and extend rearward from the windshield and along the headliner of the vehicle.

Figure 2:
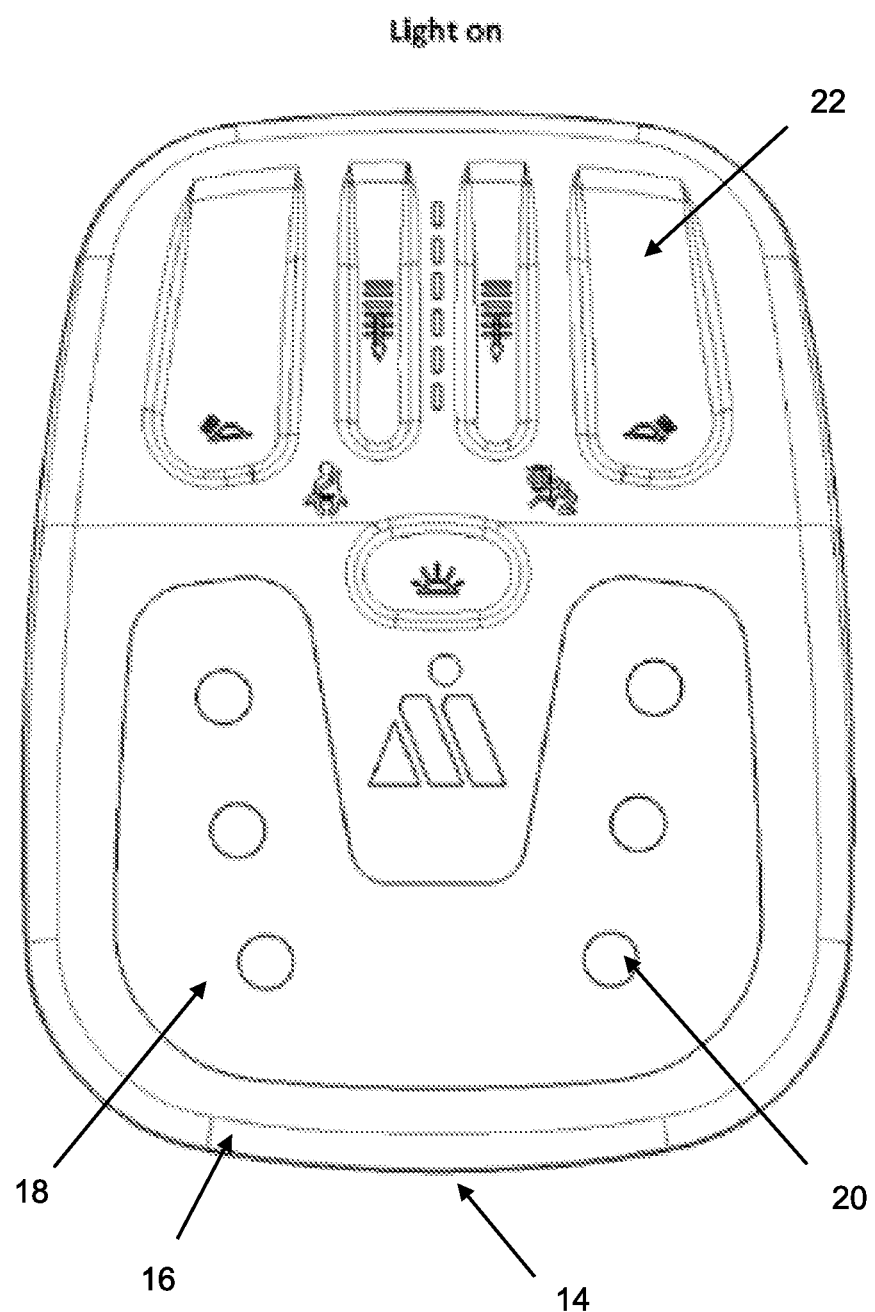
FIG. 2 is a plan view of the vehicular overhead console, with the light sources on and emitting light that passes through the light transmitting panel.

The overhead console 14 includes a frame or body or housing or base portion 16 that circumscribes and supports a transparent or light transmitting panel 18 (FIG. 2). The light transmitting panel of the overhead console comprises a transparent or translucent or visible light transmitting material, such as a liquid crystal (LC) cover or electrochromic (EC) medium or shutter film, so that lighting components or light sources 20 of the overhead console 14 that are disposed behind the light transmitting panel 18 may be visible or concealed depending on the state of the light transmitting material of the light transmitting panel 18. In the illustrated example of FIG. 2, the overhead console 14 includes user actuatable inputs or electronic switches or human machine interface (HMI) features 22 so that a user can actuate one or more electronic accessories (e.g., one or more lights or displays or a garage door opener or the like) of the overhead console and/or of the vehicle. For example, as illustrated in FIG. 2, the overhead console 14 includes user inputs corresponding to activation of the lighting components 20.

In other words, the overhead console 14 includes the base portion 16 that attaches to the interior portion of the vehicle to mount the overhead console at the vehicle. The base portion 16 accommodates one or more user actuatable inputs 22 that, when actuated by the user, control operation of associated electronic accessories of the overhead console 14, such as the one or more light sources 20. The light sources 20 are disposed behind the light transmitting panel 18 and, when electrically operated, emit light that passes through the light transmitting panel 18 to illuminate a portion of the interior portion of the vehicle. For example, the light sources 20 may be configured to provide a map light or reading light, a dome light or overhead light, or ambient lighting at the interior portion of the vehicle.

The light sources 20 may be disposed at a recessed portion of the overhead console 14 such that the light transmitting panel 18 is substantially flush with or corresponds to an opaque body surface of the overhead console surrounding the light transmitting panel 18 and the light transmitting panel 18 extends over and in front of the light sources 20 (i.e., between the light sources and the vehicle cabin). The light transmitting panel 18 is adjustable between a transparent state, where the light transmitting panel 18 allows light to pass through the light transmitting panel 18 so that the light sources 20 are visible through the light transmitting panel 18 and light emitted by the light sources may illuminate the vehicle cabin, and a darkened or opaque state, where the light transmitting panel 18 is darkened so that the light sources 20 may not be visible (or relatively less visible) through the light transmitting panel 18.

The light transmitting panel 18 may comprise a multi-layer laminate panel comprising multiple layers of transparent materials and may be electrically darkenable to darken the panel or reduce visible light transmissivity of the panel. Optionally, the light transmitting panel can be illuminated to display logos or other information. Optionally, by using light diffusing materials, the entire area can be illuminated for in-cabin lighting. The light transmitting panel 18 may have adjustable light transmission levels between the transparent state and the darkened or opaque state to cover the lighting features to make the lighting features less visible. For example, when the light sources 20 are operated to emit light, a level of light transmission of the light transmitting panel 18 may be adjusted to adjust the level of illumination at the interior portion of the vehicle (e.g., to dim or to brighten the level of illumination).

Figure 3:
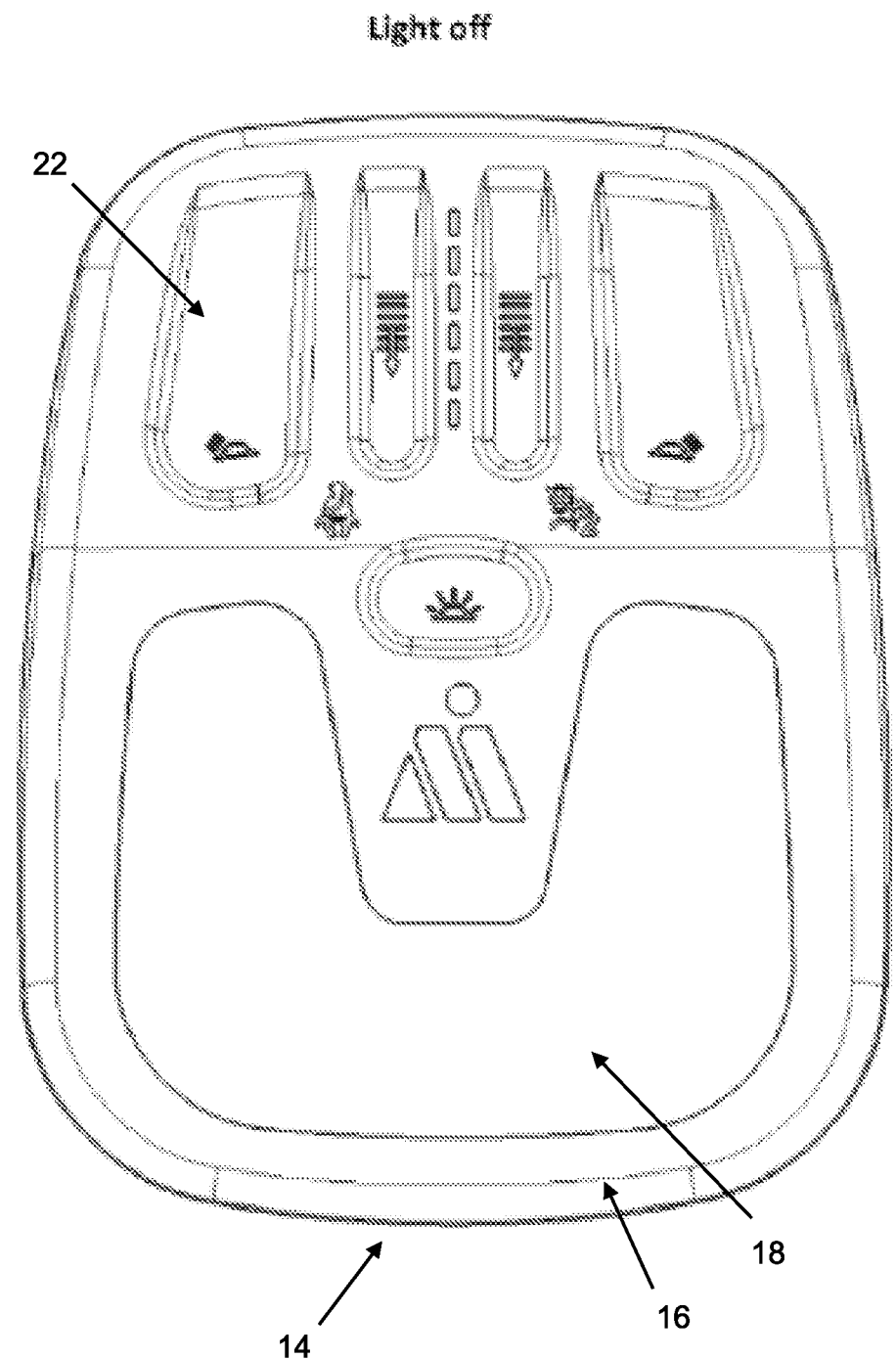
FIG. 3 is a plan view of the vehicular overhead console, with the light sources off and not viewable through the light transmitting panel.

The transparent or light transmitting panel may comprise an electrically dimmable or variable light transmissive panel. For example, the transparent panel may be dimmable via electro-optic technology, such as, for example, liquid crystal (LC) technology or electrochromic (EC) technology or the like. For example, the light transmitting panel may comprise an inner glass panel and an outer glass panel with an electrochromic medium sandwiched therebetween. The light transmitting panel may be darkenable via electrical current being applied to transparent conductive coatings at the inner and outer glass panels (such as by utilizing dimming aspects and touch/proximity sensor aspects of the electro-optic mirror reflective elements described in U.S. Pat. Nos. 9,598,016; 9,346,403; 7,626,749; 7,274,501; 7,184,190 and/or 7,255,451, which are hereby incorporated herein by reference in their entireties). The overhead console thus may operate in the transparent state (where the light transmitting panel is not dimmed or darkened, such as shown in FIG. 2) and the overhead console may operate in a darkened or opaque state (where the light transmitting panel is dimmed or darkened, such as shown in FIG. 3), and may switch between the modes, such as responsive to ambient light level at the vehicle and/or responsive to a user actuatable input or HMI device. Further, the light transmitting panel may be adjusted to one or more discrete levels of light transmissivity between the transparent state and the opaque state, where the light transmitting panel 18 may be only partially dimmed or darkened.

Figure 4B:
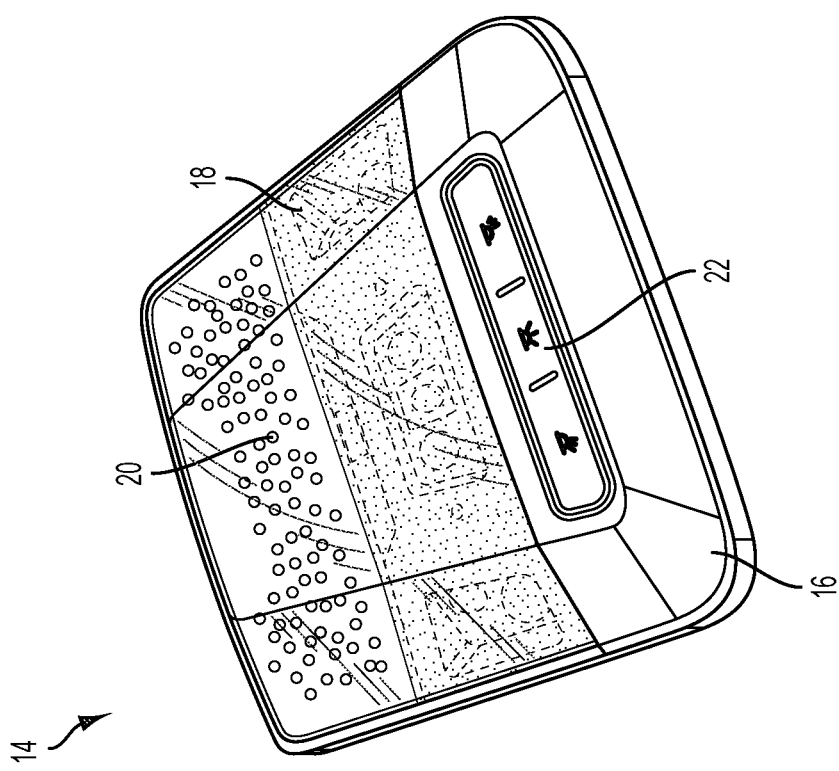
FIG. 4B is a perspective view of the vehicular overhead console, with the light sources off and not viewable through the light transmitting panel.
Figure 4A:
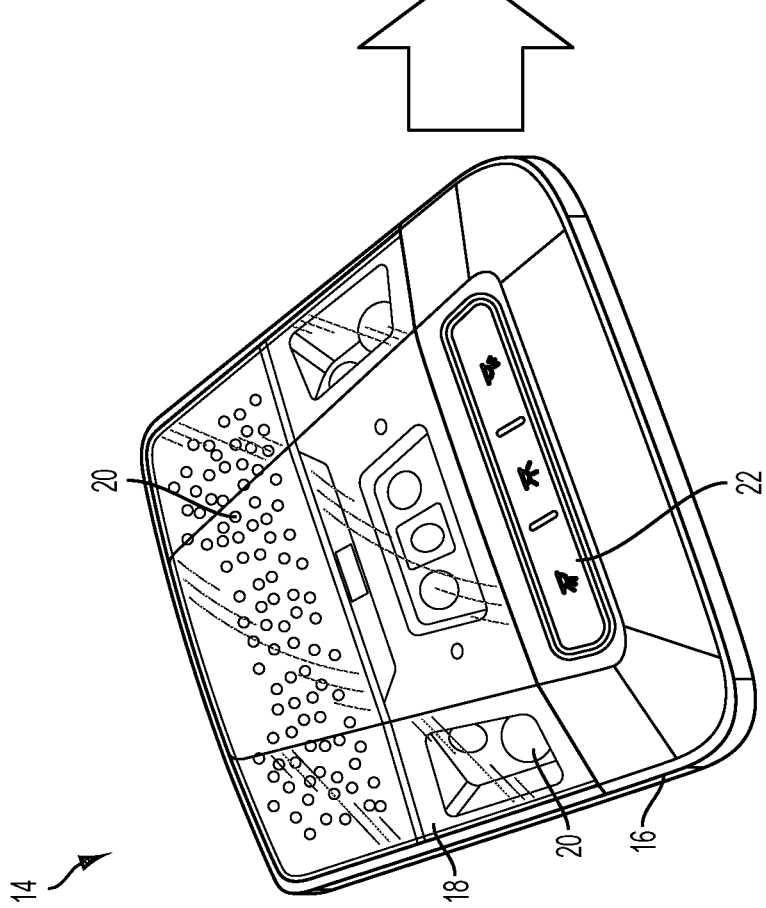
FIG. 4A is a perspective view of the vehicular overhead console, with the light sources off and viewable through the light transmitting panel.

Referring to FIGS. 4A and 4B, the light transmitting panel 18 is illustrated as transitioning between the transparent state (FIG. 4A) and the dimmed or darkened state (FIG. 4B). When the shutter film of the light transmitting panel 18 is dimmed or darkened (e.g., when the LC panel is off and/or when the EC panel is energized), the light transmitting panel 18 is in a low or zero visible light transmission state. The low transmission state may minimize the visibility of the light features (and/or other content of the console), such that the interior of the structure of the lamp is not generally visible or is otherwise obscured by the dimmed shutter film. That is, when the light transmitting panel 18 is darkened or dimmed, the light sources 20 and other structure of the overhead console behind the light transmitting panel 18 are not visible to occupants of the vehicle and the light transmitting panel 18 substantially blends in or matches the opaque outer surface of the overhead console and/or the interior surface of the vehicle surrounding the light transmitting panel.

When the shutter film of the light transmitting panel 18 is undimmed (e.g., when the LC panel is on and/or when the EC panel is de-energized), the transmitting panel 18 is in a higher visible light transmission state and more light passes through the light transmitting panel 18 than in the darkened or dimmed state. The high transmission state may maximize the visibility of the light features, such that the interior structure of the light feature is visible and light can go through the cover to a target area. In other words, when the light transmitting panel 18 is undimmed and the light sources 20 are operated to emit light, light emitted by the light sources passes through the light transmitting panel 18 and illuminates the vehicle cabin.

The light transmitting panel 18 may be adjusted between the opaque state and the transparent or light transmitting state in response to actuation of the light sources 20. For example, when the light sources 20 are in an off state and are not being operated to emit light, the light transmitting panel 18 may be operated in the opaque state to hide or conceal the light sources 20. In response to actuation of the light sources 20, the light transmitting panel 18 may be operated in the transparent state (or in a state having a light transmissivity level between the opaque state and the transparent state) so that light emitted by the light sources 20 passes through the light transmitting panel 18 and illuminates the cabin of the vehicle.

Optionally, the degree of darkening of the light transmitting panel 18 varies based on the ambient light level at the vehicle. That is, the light transmissivity of the light transmitting panel 18 is adjustable based on the determined level of ambient light at the vehicle, such as by adjusting the electric current applied to the electrochromic layer of the light transmitting panel. The ambient light level may be determined by a light sensor of the overhead console or of the vehicle or via image processing of image data captured by a camera of the vehicle. The determined ambient light level (when determined via a sensor or camera of the vehicle) may be communicated to the ECU of the overhead console via a vehicle communication bus or network of the vehicle, and the ECU may adjust darkening of the light transmitting panel 18 in response to the determined ambient light level. Optionally, when the light sources 20 are operated, the ambient light level at the interior portion of the vehicle may be determined to determine a level of illumination provided by the light sources 20 and the light transmissivity of the light transmitting panel 18 may be adjusted to adjust the level of illumination provided by the light sources 20 emitting light that passes through the light transmitting panel 18.

When the ambient light level at the interior portion of the vehicle is high (e.g., daytime) and the light sources 20 are in the off state, the light sources 20 may nevertheless be readily visible through the light transmitting panel 18 when the light transmitting panel 18 is not darkened or only partially darkened. Thus, the light transmitting panel 18 may be darkened when the ambient light level at the interior portion of the vehicle is relatively high and the light sources 20 are off to hide or conceal the light sources 20 behind the darkened light transmitting panel 18. As the ambient light level decreases to a relatively low level (e.g., nighttime) the light sources 20 in the off state may be less visible through the light transmitting panel 18 and thus less darkening (or no darkening at all) is needed to conceal the light sources 20. In other words, with the light sources in the off state, the level of darkening or tinting of the light transmitting panel 18 may be increased as the determined ambient light level increases to conceal the light sources 20, and the level of darkening or tinting of the light transmitting panel 18 may be decreased as the determined ambient light level decreases as less tinting is needed to conceal the light sources, thus decreasing the power draw at lower ambient light levels.

Further, when the overhead console extends at least partially along a vehicle sunroof or panoramic roof, the light transmissivity of the light transmitting panel 18 may be adjusted based on a level of light transmissivity or tint or transparency of the sunroof or panoramic roof. Thus, the light transmissivity of the light transmitting panel 18 may substantially conform to or match the light transmissivity of the sunroof or panoramic roof. For example, when the overhead console is operating in the transparent state, the light transmitting panel may be substantially transparent (or non-tinted) and may correspond with the transmissivity or transparency or tint of the panoramic roof panel.

Further, the user inputs 22 may be disposed at the light transmitting panel 18, such as a capacitive touch or proximity sensor disposed at the light transmitting panel and corresponding to an icon indicating a function of the user input 22 (e.g., an icon indicating that the input corresponds to operation of the light sources). When the light transmitting panel 18 is dimmed or darkened (i.e., when the overhead console switches to operating in the opaque state), the user inputs or touch or proximity sensors at the panel may be illuminated or otherwise demarcated so that they are visible at the panel. For example, when the light transmitting panel 18 is dimmed or darkened responsive to actuation of a user actuatable input (such as activation of the shutter film), the user inputs may be colored or highlighted or illuminated so as to contrast the darkened panel and be readily visible to a person viewing the overhead console 14. Optionally, for example, when the light transmitting panel 18 is dimmed or darkened responsive to the ambient light level at the vehicle being below a threshold light level, the user inputs may be illuminated or highlighted so as to contrast the darkened panel and be readily visible to a person viewing the overhead console.

The transmitting panel 18 with the LC cover or EC element or shutter film generally provides an aesthetic for the interior of the vehicle that matches the interior design of the vehicle. Additionally, utilizing a non-switchable and darkened material to cover the lighting features 20 of the overhead console 14 would result in using more light sources and/or light sources with increased current draws to achieve the same illuminance values in the target area. Increasing the number of light sources would utilize more space for the extra components and/or for the dissipation of the extra heat generated with increased current draw. Thus, the switchable shutter film that allows for variable light transmission can eliminate excess components and/or additional heat regulation.

The variable light transmitting panel 18 may provide for high transmission of visible light (such as greater than 50 percent, or greater than 70 percent, or greater than 80 percent, of visible light incident thereat) when in the undimmed state, and may provide for low transmission of visible light (such as less than 50 percent, or less than 30 percent, or less than 20 percent, of visible light incident thereat) when in the dimmed state. The variable light transmitting panel 18 may comprise a multi-layer coating that, when in the dimmed state, allows for transmission of non-visible or near-infrared light while reducing transmission of visible light (such as by utilizing aspects of the electro-optic elements described in U.S. Pat. Nos. 7,274,501; 7,255,451 and/or 7,184,190, and/or International Publication No. WO 2022/187805, which are all hereby incorporated herein by reference in their entireties. Thus, the console 14 may house or accommodate a near-IR sensitive cabin monitoring camera and near-IR light emitters, which may function regardless of whether the console panel is in the dimmed or non-dimmed state.

Optionally, the overhead console 14 may include an electronic control unit (ECU) disposed thereat, the ECU including electronic circuitry and associated software configured to provide one or more electronic functions of the console or of an accessory or system of the vehicle. For example, the light transmitting panel 18 may provide touch or proximity sensors 22 (such as transparent capacitive foils or the like) to provide the HMI features to the light transmitting panel of the console. The sensors or user inputs 22 may be colored or illuminated or otherwise demarcated so as to be visible at the light transmitting panel 18. Optionally, the user inputs 22 may be covert, as a result of the low transmission state of the transmitting panel 18, when not in use and may be colored or illuminated or otherwise demarcated so as to be visible at the light transmitting panel 18 responsive to actuation of a user input or detection of a person's hand at or near the panel or other triggering event.

Optionally, the overhead console 14 may include transparent displays that are covert when the shutter film is dimmed or darkened and are visible at the light transmitting panel 18 when the shutter film is not dimmed or darkened. For example, the overhead console 14 may provide information displays that, when energized, show vehicle status information, such as battery charge level, fuel level, speed, odometer, engine temperature, exterior temperature, compass heading, time, date and/or the like. The displays may be reconfigurable so that the user of the vehicle may select what information is displayed, and optionally may select the color of the displayed information. The transparent displays may be used to display information and may also incorporate capacitive touch functionality (where the user may touch different areas of the overhead console to display different information at the light transmitting panel).

Optionally, the lighting features 20 provided by the overhead console 14 may include in-cabin lighting, map reading lights and/or the like. The lights may be disposed at the frame portion or may comprise micro LEDs or may comprise other not-readily-discernible light sources disposed at the light transmitting panel 18 (such that the light sources are covert when not energized and visible when energized). The light sources 20 may also provide non-visible light, such as near-infrared (near-IR) lighting (e.g., the light sources may comprise near-infrared light-emitting LEDs or near-infrared light-emitting vertical-cavity surface-emitting lasers (VCSELs) or the like), such as for use with a driver monitoring system (DMS) or occupant monitoring system (OMS) of the vehicle. Optionally, the overhead console may provide perimeter lighting and/or in-cabin lighting or the like, and may provide user actuatable inputs for controlling the lighting and/or other accessories, such as by utilizing aspects of the overhead consoles described in U.S. patent application Ser. No. 17/931,988, filed Sep. 14, 2022, which published on Mar. 16, 2023 as U.S. Publication No. US-2023-0078512, which is hereby incorporated herein by reference in its entirety.

As discussed above, the frame portion 16 may include lighting devices 20, such as in-cabin illumination lights and reading lights and/or the like. The lighting devices 20 may comprise one or more LEDs or the like disposed within the frame portion 16 and behind (or above) light transmitting portions or elements of the frame portion. Thus, when the light or lights are activated or energized or electrically powered, light emitted by the light sources passes through the respective light transmitting element of the frame portion to illuminate the cabin. For example, when the overhead console is operating in the transparent state, the in-cabin illumination light or lights may be activated (such as responsive to a user input in the vehicle). When the overhead console is operating in the darkened state, the reading light or lights may be deactivated (such as responsive to a user input in the vehicle). Optionally, the lights may also be activated via actuation of the user input(s) when the overhead console is operating in the darkened state, such as to provide a dimmed or lessened level of illumination.

The overhead console is electrically powered by a power source of the vehicle, such as via connection to a wiring harness of the vehicle. The overhead console may electrically connect to the vehicle wiring harness at the headliner. Thus, the overhead console provides a module that is mounted at an interior portion of the vehicle to provide lighting and/or controls, while also allowing for a larger panoramic roof.

The overhead console 14 thus may house electrical components (such as sensors, PCBs, light sources, etc.). For example, the overhead console 14 may include light sources 20 to provide lighting at the interior portion of the vehicle. For example, the light sources may provide illumination modules such as for an OMS or DMS (where the light sources may comprise near infrared light emitting light sources or the like), dome lighting, map lights, an illuminated logo, directional lighting, galaxy lighting, and/or ambient or accent lighting at the interior portion of the vehicle. The light source or light sources may comprise one or more light emitting diodes (LEDs) or a plurality of micro-LEDs or vertical-cavity surface-emitting lasers (VC-SELs) or the like. The lighting may be adjustable, such as to control the brightness or color of the light emitted by the light sources. Furthermore, the lighting may be electrically operable responsive to a user input or may be automatically energized, such as responsive to opening of a door of the vehicle.

The overhead console may include the one or more user inputs or human machine interface (HMI) 22 configured to receive a user input, such as to control a system or function of the vehicle. The HMI 22 may be disposed at an underside of the overhead console 14 and, when actuated by a user, control operation of a light or other accessory. For example, the one or more inputs may control function of reading lights of the vehicle or the accent lighting of the overhead console or a system of the vehicle.

The user actuatable HMI 22 of the overhead console may comprise any suitable input, such as switches, buttons, or capacitive sensors. Optionally, the user actuatable input 22 may be provided by a piezo-electric actuator configured to sense the amount of force provided by a user and provide haptic feedback to the user providing the input. Optionally, the user actuatable inputs 22 may be changeable or adjustable, where the function or control provided by a given input may change responsive to a condition of the vehicle or responsive to another user input. For example, the HMI 22 may provide a series of default functions provided by the user actuatable inputs, and upon selection by a user of one of the user actuatable inputs, the HMI may adjust the functions provided by the user actuatable inputs to provide functions based on the initially selected input, such as an initial input selection of a single input to control a sunroof function of the vehicle and subsequent adjustment of the plurality of inputs to provide different functions of the sunroof of the vehicle.

The one or more inputs 22 may include a display or indicator to indicate to a user the function that would be provided if the user were to select the given input. For example, the input 22 may include a display screen that displays an icon indicating the function or a projector may project light onto the surface of the input (e.g., onto the light transmitting panel or onto the frame portion), where the projection represents the icon. For example a projector may be disposed in an interior rearview mirror or a portion of the overhead console 14 and projects light upward from the interior rearview mirror onto the surface of the overhead console. The input may be reconfigurable, such that the icon being projected is associated with the current function of the touch sensor. Thus, the icon that is being projected may change with the touch sensor function.

For example, the surface of the overhead console 14 may have a reconfigurable integrated capacitive touch or piezo-electric sensors comprising the HMI 22, so that when the projector projects light onto the surface of the overhead console and a user provides a touch or force at the surface corresponding to a portion of the projected light, the HMI interprets an intended input of the user. Optionally, the HMI may include light sensors so that, when the projector is projecting light onto the overhead console, the sensors may sense an interruption in the light projected onto the surface as an indication of a user input.

The overhead console 14 and the lighting devices 20, HMI 22 and other accessories may utilize characteristics of the overhead consoles and window assemblies described in U.S. Pat. Nos. 10,559,153; 10,427,503 and/or 10,272,833, and/or U.S. Pat. Pub. No. US-2021-0188092, and/or U.S. patent application Ser. No. 17/931,988, filed Sep. 14, 2022, which published on Mar. 16, 2023 as U.S. Publication No. US-2023-0078512; U.S. patent application Ser. No. 18/176,536, filed Mar. 1, 2023, which published on Sep. 7, 2023 as U.S. Publication No. US-2023-0284386 and/or U.S. patent application Ser. No. 18/176,544, filed Mar. 1, 2023, which published on Sep. 14, 2023 as U.S. Publication No. US-2023-0286441, and/or International PCT Application No. PCT/EP2022/078520, filed Oct. 13, 2022, which published on Apr. 20, 2023 as International Publication No. WO2023/062132, which are all hereby incorporated by reference herein in their entireties.

The overhead console may include user actuatable inputs operable to control any of the accessories of or associated with the overhead console (e.g., telematics buttons). For example, the overhead console may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,451; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the overhead console may be integrated or mounted directly to the roof or sunroof or moonroof or panoramic roof of the vehicle, such that a surface of the overhead console is exposed exterior of the vehicle or is disposed at an at least partially transparent surface (e.g., glass) of the roof of the vehicle. The overhead console may thus include solar cells to capture solar energy as a power source for the vehicle and/or accessories. The overhead console may include an antenna, such as an omnidirectional antenna and/or a radio or communications antenna. Optionally, the overhead console or system includes drivers for the sunroof or moonroof of the vehicle.

Optionally, one or more sensors (such as a radar sensor or an imaging sensor or camera) may be disposed at the overhead console and capture data representative of a field of sensing interior of the vehicle and the ECU at the overhead console may process the captured data for a system of the vehicle. For example, a camera that has a field of view interior the cabin of the vehicle may capture image data and the ECU may process captured image data such as for a DMS or OMS of the vehicle. The camera may be disposed at the overhead console and view through an aperture in the housing or frame of the overhead console or the camera may be disposed at the interior rearview mirror. The camera has a view interior the vehicle, such as at a head region of the driver of the vehicle, and may utilize characteristics of the DMS described in International Publication Nos. WO 2022/241423 and/or WO 2022/187805, which are hereby incorporated herein by reference in their entireties. By positioning the camera at the overhead console, the camera may provide an enhanced view of the rear seats of the vehicle for an occupant monitoring function. The console and/or DMS/OMS camera and/or DMS/OMS or head and face direction and/or position tracking systems and/or eye tracking systems and/or gesture recognition systems may utilize aspects of the systems described in U.S. Pat. Nos. 11,518,401; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International PCT Application No. PCT/US2022/075887, filed Sep. 2, 2022, which published on Mar. 9, 2023 as International Publication No. WO20233034956, and/or International Publication Nos. WO 2022/241423 and/or WO 2022/187805, which are hereby incorporated herein by reference in their entireties.

Optionally, the overhead console may include one or more other displays or indicators, such as the types described in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

The user actuatable inputs and/or touch sensors and/or proximity sensors and displays described above may be actuatable to control and/or adjust the accessories of the overhead console and/or vehicle. The connection or link between the controls and the display screen device and/or the navigation system and/or other systems and accessories of the overhead console or vehicle may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, or via VHF or UHF or other wireless transmission formats, depending on the particular application of the overhead console/accessory system and the vehicle. Optionally, the connections or links may be provided via various wireless connectivity or links, without affecting the scope of the present invention.

An interior rearview mirror may be mounted at or attached to or integrally formed with the forward frame portion of the overhead console. The interior rearview mirror is adjustably mounted to the overhead console via mounting structure. The mirror reflective element may comprise any suitable mirror reflective element, such as a variable reflectance electro-optic mirror reflective element that varies its reflectance responsive to electrical current applied to conductive coatings or layers of the reflective element, such as a mirror reflective element that utilizes characteristics of the interior rearview mirror assemblies described in U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties. Optionally, the mirror reflective element may comprise a dual-mode interior rearview video mirror that can switch from a traditional reflection mode to a live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2021-0245662; US-2021-0162926; US-2021-0155167; US-2020-0377022; US-2019-0258131; US-2019-0146297; US-2019-0118717 and/or US-2017-0355312, which are hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like.

Changes and modifications in the specifically described embodiments may be carried out without departing from the principles of the present invention, which is intended to be limited only by the scope of the appended claims as interpreted according to the principles of patent law.

The invention claimed is:

1. A vehicular overhead console module, the vehicular overhead console module comprising:
   a base portion configured to attach at an interior cabin portion of a vehicle to mount the vehicular overhead console module at the interior cabin portion of the vehicle;
   a light source accommodated by the base portion;
   wherein the light source, with the base portion attached at the interior cabin portion of the vehicle, is electrically operable to emit light;
   a light transmitting panel disposed at the base portion, wherein the light transmitting panel includes an electrically dimmable medium;
   wherein the electrically dimmable medium is adjustable at least between (i) a first light transmission state, where the light transmitting panel has a first level of light transmissivity, and (ii) a second light transmission state, where the light transmitting panel has a second level of light transmissivity, and wherein the first level of light transmissivity is greater than the second level of light transmissivity; and
   wherein, with the base portion attached at the interior cabin portion of the vehicle, and at least when the electrically dimmable medium is at the first light transmission state, light emitted by the light source, when electrically operated to emit light, passes through the light transmitting panel to illuminate at least a portion of an interior cabin of the vehicle.

2. The vehicular overhead console module of claim 1, wherein a structure of the light source, with the electrically dimmable medium at the second light transmission state and with the light source not electrically operated to emit light, is at least partially concealed by the light transmitting panel.

3. The vehicular overhead console module of claim 1, wherein a structure of the light source, with the electrically dimmable medium at the first light transmission state and with the light source not electrically operated to emit light, is at least partially viewable through the light transmitting panel.

4. The vehicular overhead console module of claim 1, wherein the electrically dimmable medium is at the first light transmission state when the light source is electrically operated to emit light, and wherein the electrically dimmable medium is at the second light transmission state when the light source is not electrically operated to emit light.

5. The vehicular overhead console module of claim 4, wherein, responsive to the light source being electrically operated to emit light, the electrically dimmable medium is adjusted from the second light transmission state to the first light transmission state.

6. The vehicular overhead console module of claim 1, wherein the electrically dimmable medium is adjustable between the first light transmission state and the second light transmission state based on a determined ambient light level at the interior cabin portion of the vehicle, and wherein, responsive to the determined ambient light level being above a threshold ambient light level, the electrically dimmable medium is adjusted from the first light transmission state to the second light transmission state.

7. The vehicular overhead console module of claim 1, wherein the electrically dimmable medium is further adjustable to a third light transmission state where the light transmitting panel has a third level of light transmissivity, and wherein the third level of light transmissivity is greater than the second level of light transmissivity and less than the first level of light transmissivity.

8. The vehicular overhead console module of claim 7, wherein the electrically dimmable medium is adjustable between the first light transmission state and the third light transmission state when the light source is electrically operated to emit light, and wherein the electrically dimmable medium is at the second light transmission state when the light source is not electrically operated to emit light.

9. The vehicular overhead console module of claim 1, wherein the light source is electrically operable to emit visible light, and wherein the first level of light transmissivity and the second level of light transmissivity are based on respective levels of visible light that passes through the electrically dimmable medium when the electrically dimmable medium is at the first light transmission state and when the electrically dimmable medium is at the second light transmission state.

10. The vehicular overhead console module of claim 1, wherein the light source is electrically operable to emit near infrared (near IR) light, and wherein the first level of light transmissivity and the second level of light transmissivity are based on respective levels of near IR light that passes through the electrically dimmable medium when the electrically dimmable medium is at the first light transmission state and when the electrically dimmable medium is at the second light transmission state.

11. The vehicular overhead console module of claim 10, wherein a structure of the light source, when the electrically dimmable medium is at the first light transmission state and when the electrically dimmable medium is at the second light transmission state, is at least partially concealed by the light transmitting panel.

12. The vehicular overhead console module of claim 1, wherein the electrically dimmable medium comprises a liquid crystal element.

13. The vehicular overhead console module of claim 1, wherein the light transmitting panel comprises an inner glass panel and an outer glass panel, and wherein the electrically dimmable medium is disposed between the inner glass panel and the outer glass panel.

14. The vehicular overhead console module of claim 13, wherein the electrically dimmable medium comprises an electrochromic medium.

15. The vehicular overhead console module of claim 1, wherein the electrically dimmable medium is adjusted to the first light transmission state when electrically powered, and wherein the electrically dimmable medium is adjusted to the second light transmission state when not electrically powered.

16. A vehicular overhead console module, the vehicular overhead console module comprising:
   a base portion configured to attach at an interior cabin portion of a vehicle to mount the vehicular overhead console module at the interior cabin portion of the vehicle;
   a light source accommodated by the base portion;
   wherein the light source, with the base portion attached at the interior cabin portion of the vehicle, is electrically operable to emit visible light;
   a light transmitting panel disposed at the base portion, wherein the light transmitting panel includes an electrically dimmable medium;
   wherein the electrically dimmable medium is adjustable at least between (i) a first light transmission state, where the light transmitting panel has a first level of light transmissivity, and (ii) a second light transmission state, where the light transmitting panel has a second level of light transmissivity, and wherein the first level of light transmissivity is greater than the second level of light transmissivity;
   wherein the first level of light transmissivity and the second level of light transmissivity are based on respective levels of visible light that passes through the electrically dimmable medium when the electrically dimmable medium is at the first light transmission state and when the electrically dimmable medium is at the second light transmission state;
   wherein, with the base portion attached at the interior cabin portion of the vehicle, and at least when the electrically dimmable medium is at the first light transmission state, light emitted by the light source, when electrically operated to emit visible light, passes through the light transmitting panel to illuminate at least a portion of an interior cabin of the vehicle; and
   wherein a structure of the light source, with the electrically dimmable medium at the second light transmission state and with the light source not electrically operated to emit visible light, is at least partially concealed by the light transmitting panel.

17. The vehicular overhead console module of claim 16, wherein the structure of the light source, with the electrically dimmable medium at the first light transmission state and with the light source not electrically operated to emit visible light, is at least partially viewable through the light transmitting panel.

18. The vehicular overhead console module of claim 16, wherein the electrically dimmable medium is at the first light transmission state when the light source is electrically operated to emit visible light, and wherein the electrically dimmable medium is at the second light transmission state when the light source is not electrically operated to emit visible light.

19. The vehicular overhead console module of claim 18, wherein, responsive to the light source being electrically operated to emit visible light, the electrically dimmable medium is adjusted from the second light transmission state to the first light transmission state.

20. The vehicular overhead console module of claim 16, wherein the electrically dimmable medium is adjustable between the first light transmission state and the second light transmission state based on a determined ambient light level at the interior cabin portion of the vehicle, and wherein, responsive to the determined ambient light level being above a threshold ambient light level, the electrically dimmable medium is adjusted from the first light transmission state to the second light transmission state.

21. The vehicular overhead console module of claim 16, wherein the electrically dimmable medium comprises a liquid crystal element.

22. The vehicular overhead console module of claim 16, wherein the light transmitting panel comprises an inner glass panel and an outer glass panel, and wherein the electrically dimmable medium comprises an electrochromic medium disposed between the inner glass panel and the outer glass panel.

23. A vehicular overhead console module, the vehicular overhead console module comprising:
- a base portion configured to attach at an interior cabin portion of a vehicle to mount the vehicular overhead console module at the interior cabin portion of the vehicle;
- a light source accommodated by the base portion;
- wherein the light source, with the base portion attached at the interior cabin portion of the vehicle, is electrically operable to emit light;
- a light transmitting panel disposed at the base portion, wherein the light transmitting panel includes an electrically dimmable medium;
- wherein the light transmitting panel comprises an inner glass panel and an outer glass panel, and wherein the electrically dimmable medium is disposed between the inner glass panel and the outer glass panel, and wherein the electrically dimmable medium comprises an electrochromic medium;
- wherein the electrically dimmable medium is adjustable at least between (i) a first light transmission state, where the light transmitting panel has a first level of light transmissivity, and (ii) a second light transmission state, where the light transmitting panel has a second level of light transmissivity, and wherein the first level of light transmissivity is greater than the second level of light transmissivity;
- wherein, with the base portion attached at the interior cabin portion of the vehicle, and at least when the electrically dimmable medium is at the first light transmission state, light emitted by the light source, when electrically operated to emit light, passes through the light transmitting panel to illuminate at least a portion of an interior cabin of the vehicle; and
- wherein the electrically dimmable medium is at the first light transmission state when the light source is electrically operated to emit light, and wherein the electrically dimmable medium is at the second light transmission state when the light source is not electrically operated to emit light.

24. The vehicular overhead console module of claim 23, wherein, responsive to the light source being electrically operated to emit light, the electrically dimmable medium is adjusted from the second light transmission state to the first light transmission state.

25. The vehicular overhead console module of claim 23, wherein the light source is electrically operable to emit visible light, and wherein the first level of light transmissivity and the second level of light transmissivity are based on respective levels of visible light that passes through the electrically dimmable medium when the electrically dimmable medium is at the first light transmission state and when the electrically dimmable medium is at the second light transmission state.

26. The vehicular overhead console module of claim 23, wherein the light source is electrically operable to emit near infrared (near IR) light, and wherein the first level of light transmissivity and the second level of light transmissivity are based on respective levels of near IR light that passes through the electrically dimmable medium when the electrically dimmable medium is at the first light transmission state and when the electrically dimmable medium is at the second light transmission state.

* * * * *